United States Patent
Rossman et al.

[11] Patent Number: 5,628,486
[45] Date of Patent: May 13, 1997

[54] CONCEALABLE BEVERAGE CONTAINER HOLDER

[75] Inventors: Christopher A. Rossman, Comstock Park; Larry Porter, Galesburg, both of Mich.

[73] Assignee: Summit Polymers, Kalamazoo, Mich.

[21] Appl. No.: 453,692

[22] Filed: May 30, 1995

[51] Int. Cl.$^6$ ................................................. A47K 1/08
[52] U.S. Cl. ................... 248/311.2; 224/926; 297/188.19
[58] Field of Search ................................. 248/311.2, 314, 248/315; 297/188.16, 188.19; 224/926, 282

[56] References Cited

U.S. PATENT DOCUMENTS

| | | | |
|---|---|---|---|
| 4,511,072 | 4/1985 | Owens | 224/329 |
| 4,728,019 | 3/1988 | Parker | 224/329 |
| 4,756,572 | 7/1988 | Dykstra et al. | 297/188.17 |
| 4,759,584 | 7/1988 | Dykstra et al. | 297/188.16 |
| 4,828,211 | 5/1989 | McConnell et al. | 248/311.2 |
| 4,953,771 | 9/1990 | Fischer et al. | 248/311.2 X |
| 4,955,571 | 9/1990 | Lorence et al. | 248/311.2 |
| 4,981,277 | 1/1991 | Elwell | 248/311.2 |
| 5,007,610 | 4/1991 | Christiansen et al. | 248/311.2 |
| 5,024,411 | 6/1991 | Elwell | 248/311.2 |
| 5,096,152 | 3/1992 | Christiansen et al. | 248/311.2 |
| 5,190,259 | 3/1993 | Okazaki | 248/311.2 |
| 5,248,183 | 9/1993 | Gignac et al. | 297/188.16 |
| 5,259,580 | 11/1993 | Anderson et al. | 248/311.2 |
| 5,330,146 | 7/1994 | Spykerman | 248/311.2 |

*Primary Examiner*—Ramon O. Ramirez
*Attorney, Agent, or Firm*—Varnum, Riddering, Schmidt & Howlett LLP

[57] ABSTRACT

A container holder assembly for holding beverage containers is adapted for mounting in a vehicle. The holder includes a housing for insertion in a vehicle, the housing having an open front. Two container retaining arms are mounted in the housing for movement from a retracted position within the housing to an extended position outside the housing. The arms form at least a portion of the container holder. A door is pivotably mounted to the housing for movement between a substantially vertical closed position covering the opening in the housing and an open substantially horizontal position forming a supporting shelf for a container. An actuator comprising a cam on the door and a follower on one of the arms and mounted between the door and the arm to pivot the arm from the extended position to the retracted position as the door moves between the open position and the closed position. The other arm has a follower which contacts the first arm to move the other arm into the housing as the first arm is moved into the retracted position.

15 Claims, 2 Drawing Sheets

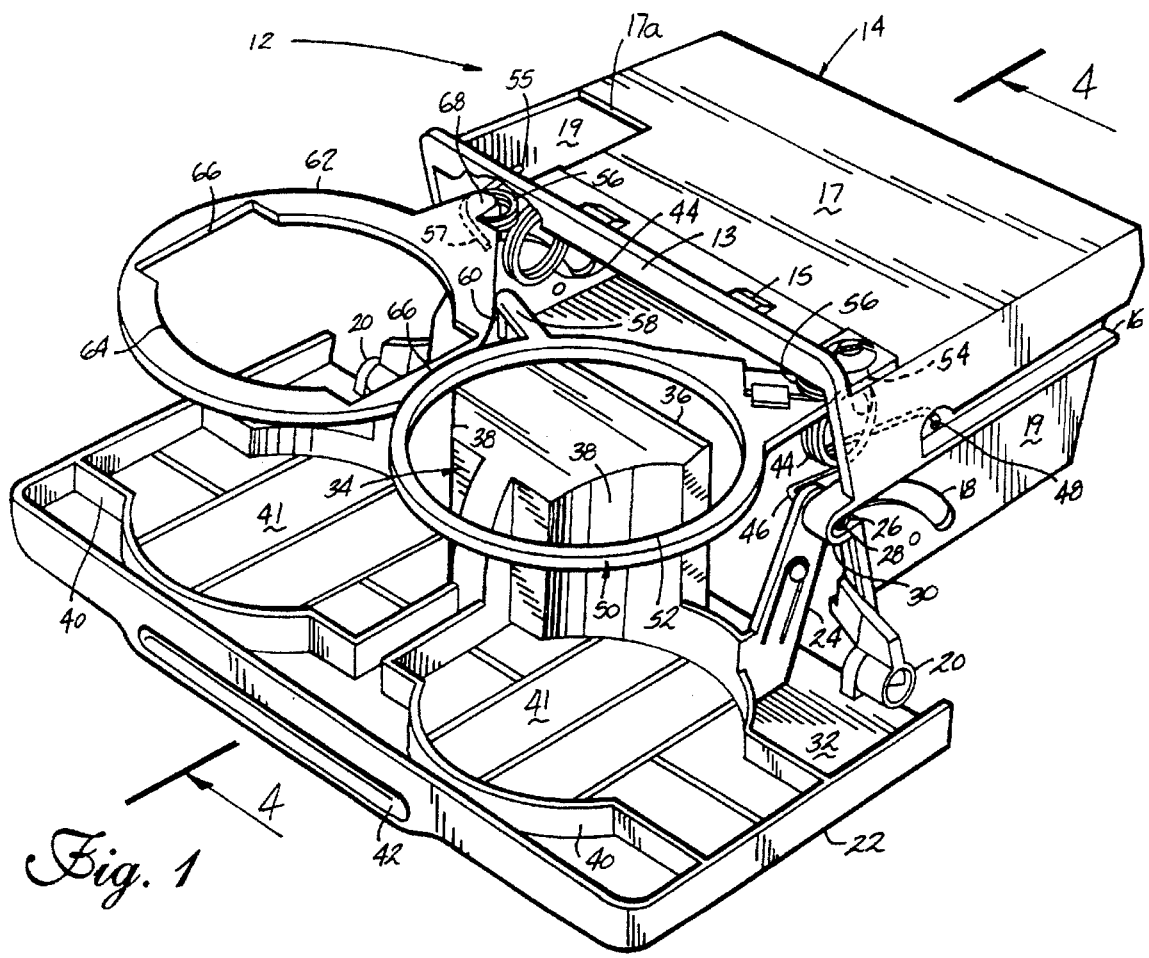

CONCEALABLE BEVERAGE CONTAINER HOLDER

BACKGROUND OF THE INVENTION

1. Field of the Invention

This invention relates to beverage container holders generally and, in particular, to vehicle beverage container holders which can be moved from a concealed storage position to an open use position.

2. State of the Prior Art

Concealable container holders for vehicles are particularly useful in motor vehicles where space conservation and aesthetics are prime concerns. When not in use, a concealable container holder can be stored in a dash board or arm rest, thereby freeing the space occupied by the container holder and removing it from the sight of the driver and passengers. Minimizing the storage size of container holders is particularly important when the unit is designed to hold multiple containers.

In recent years, vehicle manufacturers have provided beverage container holders in vehicles as original equipment. However, many of the past implementations have included those using shallow cylindrical recesses formed in the back side of the glove compartment door or a deep cylindrical support recess located in the armrest or console into which a beverage container or cup can be placed. Both structures have drawbacks. Deep cylindrical recesses in the armrest or console holder gather dirt and foreign matter which may be difficult or inconvenient to remove. In order to provide storage space in the glove compartment, its door offers little lateral support to the beverage container. Therefore, the container can easily be spilled when a moving vehicle makes a sharp turn or hits a bump. Also, the contents of the open glove compartment can be jarred and fall from the open compartment while the car is moving.

Previous beverage holders have been mounted in a dash panel and in armrests. These arrangements have typically provided lateral support as well as vertical support but some designs have been able to hold only a single beverage container holder. Space for simultaneously holding two containers has also been desirable. Such a beverage container holder must necessarily conserve space yet hold up to two beverage containers at a time. In addition, because of the variety of beverage container shapes, beverage container holders must be adaptable to securely hold various different sizes and shapes of beverage containers.

Although many different designs of container holder designs have been disclosed, the majority of the designs embody a sliding mechanism to remove the holder from its concealed position. For example, see U.S. Pat. No. 5,330,146. A beverage container holder is either rotatably or slidably disposed in a vehicle. As the holder is either slid or rotated out of its retracted position, two opposed C-shaped members form a recessed holder for a single beverage container. One of the C-shaped members can be rotatably disposed from the other C-shaped member thereby forming two recesses for holding two beverage containers.

In U.S. Pat. No. 4,981,277, a beverage container holder is also slidably disposed in a vehicle's center console. The holder may be slid forward from its stored position in the console. As the holder is slid out of the console in a drawer-like fashion, a pair of arcuate arms pivot outward from the center of the upper portion of the holder. The arcuate arms are adjustable and, in conjunction with an arcuate recess in the upper portion of the holder forms, engage the sides of a beverage container. The container bottom rests on a lower support portion of the holder.

Also, in U.S. Pat. No. 4,955,571, a dual-action concealable container holder slides out like a drawer and pivots like a swing-out shelf. The shelf is mounted so that it can both slide in and out of the housing and rotate about an axis other than the central axis of the housing. Two shelves can be mounted one over the other in a single housing such that the shelves rotate away from each other when moved out of the housing. A vertically rotatable support mounted on each shelf pivots from a horizontal position to a vertical position to provide support for the bottom of the beverage container inserted into the holder.

SUMMARY OF THE INVENTION

The invention relates to a container holder assembly for holding beverage containers in a vehicle. The container holder assembly comprises a housing having an open front. At least one arm is pivotably mounted in the housing for movement between a retracted position and an extended position and forms at least a portion of the container holder. A door is pivotably mounted to the housing for movement between a substantially vertical closed position covering the open front in the housing and an open substantially horizontal position forming a supporting shelf for a container. An actuator is located between the door and the arm to pivot the arm from the extended position to the retracted position as the door moves between the open position and the closed position.

The container retaining arm is biased to the extended position and pivots from the retracted position to the extended position as the door rotates between the closed position and the open position. In one embodiment of the invention, a portion of the arm has an arcuate rim portion and a linear rim portion to accommodate retention of cylindrical and rectangular shape containers. Preferably, two container retaining arms are pivotably mounted to the housing for movement between a retracted position inside the housing and an extended position outside the housing and both arms are pivoted to the retracted position when the door is rotated between the open position and the closed position. The two arms overlie each other at least when the arms are in the retracted position.

In a preferred embodiment, the actuator between the door and the arm comprises a cam on the door and a follower on one of the arms. One arm has a guide surface and the other arm has a follower which contacts the guide surface of the one arm to pivot the other arm from the extended position to the retracted position as the one arm rotates from the extended position to the retracted position.

The door preferably has a support leg secured to the door at one end and has a finger at the other end. The finger is supported by the housing when the door is in the open position. The door is biased in the open and in the closed positions with a biasing spring mounted at one end to the housing and at the other end to the other end of the support leg on the door.

BRIEF DESCRIPTION OF THE DRAWINGS

The invention will now be described with reference to the accompanying drawings in which:

FIG. 1 is a perspective view of a cup holder assembly according to the invention showing the cup holder door in its open position;

FIG. 2 is a perspective view, partially cut away, of the cup holder assembly shown in FIG. 1 and showing the cup holder in its closed position;

DESCRIPTION OF THE PREFERRED EMBODIMENT

Figure 3:
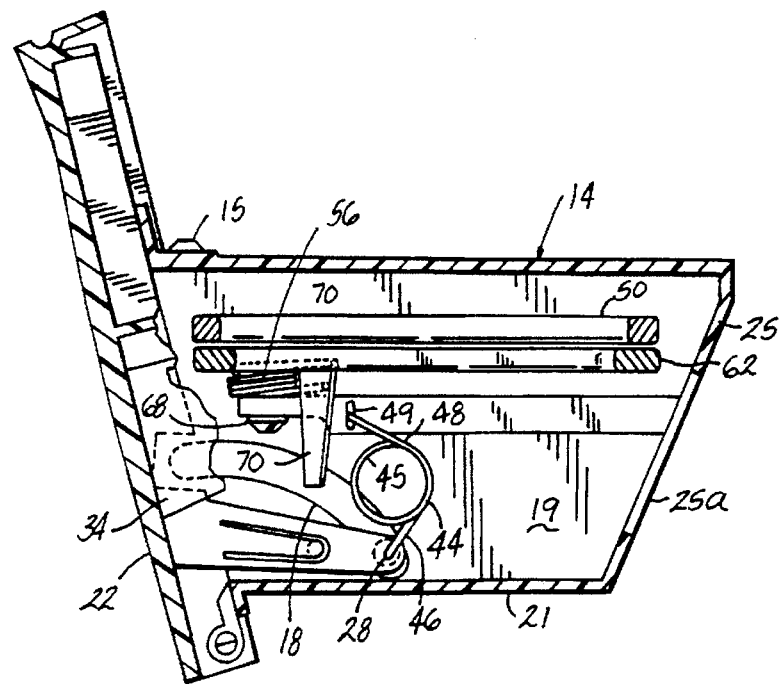
FIG. 3 is a side elevational view in section of the cup holder assembly shown in FIGS. 1 and 2, showing the cup holder door in its closed position and taken along lines 3—3 of FIG. 2.

Referring now to the drawings, and to FIGS. 1 and 2 in particular, a concealable beverage container holder assembly 12 according to the invention comprises a housing 14, a door 22, and pivotable container support arms 50 and 62. The components of the holder assembly 12 can be formed from plastic or other readily moldable materials which display rigid characteristics after molding and curing.

Housing 14 is essentially a rectangular polyhedron having a top wall 17, a bottom wall 21 (FIG. 3), a back wall 25 (FIG. 3) and two opposite side walls 19 with one open forward side formed by housing rim 13. An opening 17a is formed in a front corner of the top wall 17. The back wall 25 has a central opening 25a. The specific size and shape of housing 14 can be modified to fit the opening in the vehicle to which it is to be installed. Side walls 19 have slots 16 which form guides for positioning the housing in a dashboard, armrest or console of a vehicle. The top wall has a series of fixed retainers 15 which mate with the portion (not shown) of the dashboard to retain the housing in a seated position in the dashboard, armrest or console of a vehicle. Spring-loaded retainers (not shown) on the bottom wall 21 can also be provided for this purpose. Arcuate slots 18 are located in a lower portion of vertical walls 19. Slots 18 form an arc substantially about hinges 20 located at the bottom forward edge of housing 14 and terminate at stops 30. Stops 30 are located on and protrude from housing rim 13. The degree of protrusion of stops 30 are dependent on the depth of retainer ribs 40 on door 22 as will be more fully described below.

In its closed position, door 22 is in a substantially vertical position or in a position corresponding to the contour of the vehicle element in which it is installed. Door 22 is pivotally attached to the open forward side of housing 14 with hinges 20 located at opposing ends of door 22 and substantially at a bottom portion of housing 14 and door 22. The position of hinge 20 mounts the door 22 for rotation from a closed position (as shown in FIG. 2) to an open position (as shown in FIG. 1) wherein door 22 is substantially horizontal with recess 42 in the upper edge of door 22 projecting away from housing 14. The recess 42 provides a finger for the occupant to grip to pull the door 22 open. Door 22 has an inner face 32 which forms a base on which the bottoms of beverage containers can rest when positioned in the arms 50 and 62.

Raised retaining ribs 40 are molded on inner face 32 in a shape corresponding to the shape of the base of beverage containers to be held by container holder 12, thereby forming retaining recesses 41. The contour of retaining recesses 41 can be round, rectangular, or both. In the preferred embodiment, the shape of retaining recesses 41 is a combination of round and rectangular to accommodate a wide variety of beverage containers. Retainer ribs 40 also act as strengtheners to provide rigidity to door 22. A frame 34 also projects from the inner face 32 of door 22 and is located midway between retaining recesses 41. Frame 34 has arcuate surfaces 38 which correspond to the desired contour of retaining recesses 41 and, in conjunction with ribs 40, form retaining recesses 41, thereby forming a lateral restraint for beverage containers positioned in the container holder 12. Frame 34 also has rear frame rim 36 which interfaces with follower 70 on lower pivotable container support arm 62 in a camming action to retract the container support arms 50 and 62 when door 22 is closed as described more fully below.

Support legs 24 project rearwardly from inner face 32 at each end of door 22 and terminate at guide fingers 26 which in turn project outward at substantially opposing right angles from support legs 24. Guide fingers 26 positionally correspond to and are located in slots 18 in housing 14. Guide fingers 26 travel in arcuate slots 18 as door 22 is opened and closed. As door 22 is opened and reaches a substantially horizontal position, fingers 26 abut the upper end of slots 18 at stops 30, preventing additional rotation of door 22 about hinges 20. Support legs 24 and fingers 26 abutted against stops 30 maintain door 22 in a horizontal position and support the weight imparted to door 22 by beverage containers resting on the inner face 32 of door 22 in retaining recesses 41.

Figure 4:
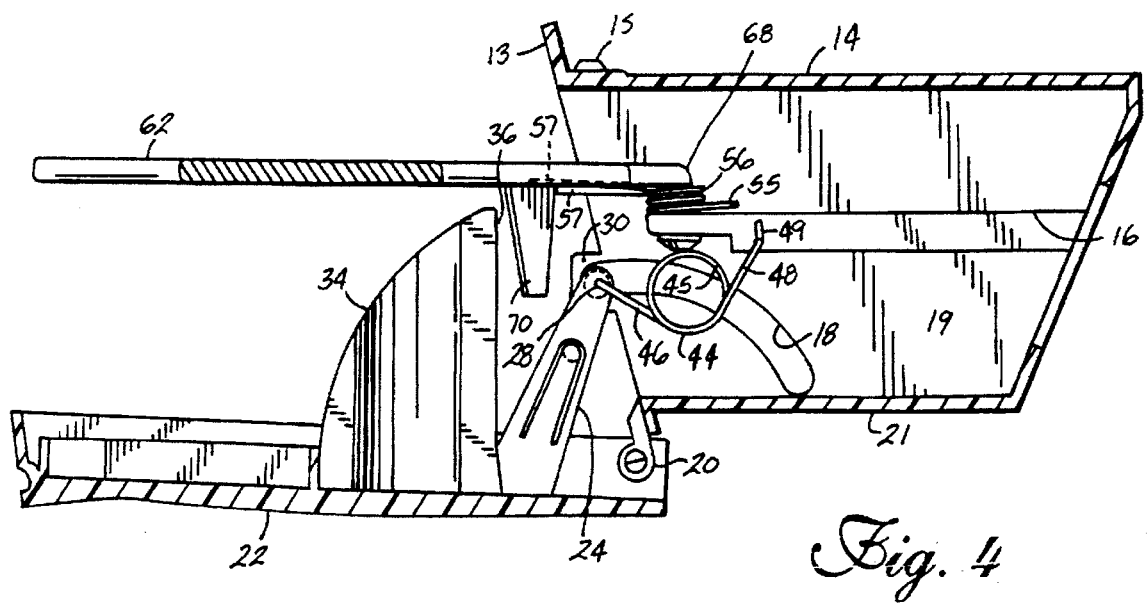
FIG. 4 is a side elevational view in section, like FIG. 3, of the cup holder assembly shown in FIGS. 1–3 but showing the cup holder door in its open position.

Referring now to FIGS. 3 and 4, overcenter springs 44 are mounted between the legs 24 and the housing walls 19 to bias the door to the open and the closed position. Overcenter springs 44 are comprised of torsional coil 45, first spring end 46 and second spring end 48. First spring end 46 is positioned in aperture 28 of finger 26 and second spring end 48 is positioned in aperture 49 in wall 19 of housing 14. In its installed position, coil 45 always maintains a certain residual torsional force to provide a biasing force on door 22 in both the open and closed position. Aperture 49 is positionally located relative to slot 18 so that as door 22 is rotated from its closed position shown in FIG. 3 about hinge 20 to its open position shown in FIG. 4, the first and second spring ends 46 and 48 are forced toward each other, thereby increasing the torsional force of coil 45 and resisting door rotation to the open position. The torsional force continues to increase until door 22 has approximately reached the midpoint of its rotational travel. As door 22 continues its rotation past midpoint, the first and second spring ends 46 and 48 move away from each other, thereby partially relaxing the torsional force of coil 45 until finger 26 contacts stop 30, thereby establishing door 22 in its open position. Residual torsional force in coil 45 maintains finger 26 in contact with stops 30 and door 22 in its open position. As can be seen in FIGS. 1 and 4, support arms 50 and 62 lie in a substantially horizontal position when the door 22 is in the open position. Further, the support arms 50 and 62 each lie in a plane which is substantially parallel to the retaining recesses 41 on the door 22.

When door 22 is in its closed position, overcenter spring 44 imparts a similar biasing force to maintain inner face 32 of door 22 in contact with stops 30 and rim 13, thereby preventing the door from vibrating against housing 14 and producing rattling noises induced by various vehicle vibrations.

Referring again to FIG. 1, lower pivotal container support arm 62 is mounted to side wall 19 via pivot pin 68 and is cantilevered therefrom, thereby mounting support arm 62 for rotation in a horizontal plane from a retracted position inside housing 14 (FIGS. 2, 3) to an extended position vertically disposed over retainer recess 41 in open horizontal door 22 (FIGS. 1 and 4). Support arm 62 has a pair of arcuate portions 64 which define a circular opening extending through the center of support arm 62. Support arm 62 has a pair of opposite U-shaped portions 66 which define a rectangular opening in superimposed relationship over the circular opening so that support arm 62 can receive both circular and rectangular beverage containers. As shown in FIGS. 3 and 4, follower 70 extends downwardly from support arm 62 substantially at a right angle from the plane of support arm 62. Torsional bias spring 56 is wound around pivot pin 68 and has a first spring end 55 disposed against follower 70 and a second spring end 57 disposed against side wall 19. Bias spring 56 imparts a torsional force about pin 68 and between follower 70 and side wall 19, thereby biasing support arm 62 into an extended position over door 22 when door 22 is in its open horizontal position. Follower 70 contacts rear frame rim 36 on door 22. As door 22 is pivoted from its horizontal open position to its closed position, rim 36 maintains contact with follower 70 and through a camming action rotates support arm 62 into housing 14. When door 22 is in its fully closed position with inner face 32 in contact with housing 14, support arm 62 is fully rotated into housing 14.

Referring again to FIG. 1, an upper pivotable container support arm 50 is pivotably mounted within housing 14 and to the upper surface of housing 14 located proximate to rim 13. Support arm 50 is generally circular in nature with a circular rim 52 forming a circular opening therethrough. The opening in arm 50 can correspond to the shape of the opening in support arm 62 or it can be of a larger diameter to accommodate larger size beverage containers. In the preferred embodiment, the opening in arm 50 is of larger diameter than the circular opening in arm 62, thereby providing vehicle occupants with a variety of options for holding beverage containers. Support arm 50 is pivotably mounted to housing 14 through pivot pin 54 for rotation in a horizontal plane from a retracted position inside housing 14 (FIGS. 2, 3) to an extended position vertically disposed over retainer recess 41 in open horizontal door 22 (FIG. 1). A second torsional bias spring 56 is installed about pivot pin 54. First spring end 55 of bias spring 56 is positioned against wall 19 and second spring end 57 is positioned against a surface of support arm 50, thereby biasing support arm 50 in an extended position with the circular opening positioned above retainer recess 41 in door 22. Support arm 50 is pivotably movable to fit within housing 14 when in a retracted position as shown in FIG. 3. Leg 58 extends from the periphery of and in the same plane as support arm 50 and terminates proximate to the rear outer periphery of lower support arm 62. Follower 60 extends below leg 58 at substantially a right angle and abuts an outer surface of support arm 62 such that, as support arm 62 is rotated to its retracted position within housing 14, a camming action occurs between the outer surface of support arm 62 and follower 60, thereby simultaneously rotating support arm 50 into its retracted position until both support arms 50 and 62 are within housing 14. As shown in FIG. 3, upper pivotable container support arm 50 is disposed over the top of lower pivotable container support arm 62 within housing 14 in the retracted position of container holder 12.

Opening beverage container holder 12 from its closed and retracted position to its extended usable position requires only one simple movement by the vehicle occupant. The occupant grips recess 42 in the upper surface of door 22 and rotates door 22 down to its horizontal, open position. As door 22 rotates to the open position, rim 36 also is repositioned to the forward end of housing 14, substantially proximate to the plane of rim 13. As rim 36 moves forward, follower 70 maintains contact with rim 36 and the torsional force from bias spring 56 extends support arm 62 over the retainer recess 41 of door 22. As support arm 62 rotates to its extended position, follower 60 on leg 58 of support arm 50 follows the outer surface of support arm 62, whereby the force of bias spring 56 rotates support arm 50 until it is also in its fully extended position over retainer recess 41 of door 22. When support arms 50 and 62 are fully extended, they present two adjacent positions for holding beverage containers. Support arms 50 and 62 laterally restrain an upper portion of the beverage containers while retainer recesses 41 support and laterally restrain the lower portion of the beverage containers.

Retraction of the support arms 50 and 62 into the stored position in housing 14 also requires only one simple movement by the vehicle occupant. Door 22 is rotated from its horizontal open position to its closed position by rotating door 22 about hinge 20. The rotation of door 22 thereby displaces rim 36 into housing 14 which, in turn, by camming action rotates support arm 62 against the biasing force of spring 56 until support arm 62 is completely rotated into a retracted position in housing 14. Follower 60 is also displaced by a similar camming action by the rotation of support arm 62 to rotate support arm 50 into a concealed position wherein support arm 50 is disposed vertically above support arm 62. When inner face 32 of door 22 contacts housing rim 13, container holder 12 is in a stored position and an outer surface 23 of door 22 is displayed to the occupants, thereby concealing container holder 12 from sight. Outer surface 23 can be textured and colored to blend with the vehicle element in which it is installed.

While particular embodiments of the invention have been shown, it will be understood, of course, that the invention is not limited thereto since modifications may be made by those skilled in the art, particularly in light of the foregoing teachings. Reasonable variations and modifications are possible within the scope of the foregoing disclosure of the invention without departing from the spirit of the invention.

The embodiments of the present invention in which an exclusive property or privilege is claimed are defined as follows:

1. A container holder assembly for holding beverage containers in a vehicle comprising:

a housing having an open front;

at least one container retaining arm pivotably mounted in the housing for movement between a retracted position within the housing and an extended position outside of the housing and forming at least a portion of the container holder, the retaining arm lying in a substantially horizontal plane when said retaining arm is in the extended position;

a door pivotably mounted to the housing for movement between a substantially vertical closed position covering the opening in the housing and an open substantially horizontal position forming a supporting shelf for a container, whereby the plane of the at least one container retaining arm lies substantially parallel to the door when the door is in the open position; and an actuator between the door and the arm to pivot the arm from the extended position to the retracted position as the door moves between the open position and the closed position, the actuator comprising a cam on one of the door and the arm and a follower on the other of the door and the arm.

2. The container holder in accordance with claim 1 wherein the arm is biased to the extended position and the arm pivots from the retracted position to the extended position as the door pivots between the closed position and the open position.

3. The container holder in accordance with claim 2 wherein a second container retaining arm is pivotably mounted to the housing for movement between a retracted position inside the housing and an extended position outside the housing and both arms are pivoted to the retracted position when the door is rotated between the open position and the closed position.

4. The container holder in accordance with claim 3 wherein the actuator comprises:

a cam on the door; and a follower on one of the arms.

5. The container holder in accordance with claim 4 wherein:

one of the arms has an outer guide surface; and the other of the arms has a follower which contacts the outer guide surface of the one arm to pivot the other arm from the extended position to the retracted position as the one arm rotates from the extended position to the retracted position.

6. The container holder in accordance with claim 1 wherein a portion of the arm has an arcuate rim portion and a linear rim portion to accommodate retention of cylindrical and rectangular shaped containers.

7. The container holder in accordance with claim 1 wherein a second container retaining arm is pivotably mounted to the housing for movement between a retracted position inside the housing and an extended position outside the housing and both arms are pivoted to the retracted position when the door is rotated between the open position and the closed position.

8. The container holder in accordance with claim 7 wherein the actuator comprises:

a cam on the door; and a follower on one of the arms.

9. The container holder in accordance with claim 8 wherein:

one of the arms has a guide surface; and the other of the arms has a follower which contacts the guide surface of the one arm to pivot the other arm from the extended position to the retracted position as the one arm rotates from the extended position to the retracted position.

10. A container holder assembly for holding beverage containers in a vehicle comprising:

a housing having an open front;

at least one container retaining arm pivotably mounted in the housing for movement between a retracted position within the housing and an extended position outside of the housing and forming at least a portion of the container holder, the retaining arm lying in a substantially horizontal plane when said retaining arm is in the extended position;

a door pivotably mounted to the housing for movement between a substantially vertical closed position covering the opening in the housing and an open substantially horizontal position forming a supporting shelf for a container, whereby the plane of the at least one container retaining arm lies substantially parallel to the door when the door is in the open position;

the door is biased to the open and to the closed position; and an actuator between the door and the arm to pivot the arm from the extended position to the retracted position as the door moves between the open position and the closed position.

11. The container holder in accordance with claim 10 wherein a biasing spring is mounted to the housing and to the door.

12. The container holder in accordance with claim 11 wherein the door further comprises:

a support leg projecting toward the housing and having an outer end;

a finger at the outer end of the support leg and engageable with the housing when the door is in the open position to support the door when the door is in the open position.

13. The container holder in accordance with claim 12 wherein the biasing spring is mounted to the housing and to the outer end of the support leg.

14. A container holder assembly for holding beverage containers in a vehicle comprising:

a housing having an open front;

first and second container retaining arms pivotably mounted in the housing for movement between a retracted position within the housing and an extended position outside of the housing and forming at least a portion of the container holder, the retaining arms lying in a substantially horizontal plane when said retaining arms are in the extended position, the first and second arms are in overlying relationship with respect to each other when the arms are in the retracted position;

a door pivotably mounted to the housing for movement between a substantially vertical closed position covering the opening in the housing and an open substantially horizontal position forming a supporting shelf for a container, whereby the plane of the container retaining arms lies substantially parallel to the door when the door is in the open position; and an actuator between the door and the arms to pivot the arms from the extended position to the retracted position as the door moves between the open position and the closed position.

15. A container holder assembly for holding beverage containers in a vehicle comprising:

a housing having an open front;

at least one container retaining arm pivotably mounted in the housing for movement between a retracted position within the housing and an extended position outside of the housing and forming at least a portion of the container holder, the retaining arm lying in a substantially horizontal plane when said retaining arm is in the extended position;

a pivot mounting for mounting the at least one container retaining arm for movement about a substantially vertical axis;

a door pivotably mounted to the housing for movement between a substantially vertical closed position covering the opening in the housing and an open substantially horizontal position forming a supporting shelf for a container, whereby the plane of the at least one container retaining arm lies substantially parallel to the door when the door is in the open position; and an actuator between the door and the arm to pivot the arm from the extended position to the retracted position as the door moves between the open position and the closed position.

* * * * *